United States Patent [19]

Ohshima et al.

[11] Patent Number: 5,161,046

[45] Date of Patent: Nov. 3, 1992

[54] BEAM POSITION CONTROL APPARATUS

[75] Inventors: Minoru Ohshima; Shuichi Morio; Susumu Saitoh; Osamu Namikawa; Kazutoshi Obara; Minoru Seino; Takeshi Mochizuki; Makoto Nakura, all of Ibaraki; Akira Arimoto; Masuo Kasai, both of Tokyo, all of Japan

[73] Assignees: Hitachi Koki Co., Ltd.; Hitachi, Ltd., both of Tokyo, Japan

[21] Appl. No.: 635,823

[22] Filed: Jan. 3, 1991

[30] Foreign Application Priority Data

Jan. 31, 1990 [JP] Japan .................................. 2-19045

[51] Int. Cl.$^5$ .............................................. G02B 26/08
[52] U.S. Cl. ...................................................... 359/212
[58] Field of Search ........................ 350/6.1, 6.5, 6.6; 356/152; 250/234, 235, 236; 359/197, 212, 213

[56] References Cited

U.S. PATENT DOCUMENTS

| | | |
|---|---|---|
| 3,694,558 | 9/1972 | Eisenberg et al. ............ 350/6.1 X |
| 4,063,819 | 2/1977 | Hayes ............................... 356/152 |
| 4,334,775 | 6/1982 | Breecher et al. ................ 356/152 |
| 4,800,270 | 1/1989 | Blais ................................. 250/235 |

OTHER PUBLICATIONS

"Applied Optical Electronics Handbook", published by Shokodo Company, Ltd., Apr. 10, 1989.

Primary Examiner—Frank Gonzalez
Attorney, Agent, or Firm—Cushman, Darby & Cushman

[57] ABSTRACT

A beam position control apparatus in which a light beam is led into a light detector from a light generating source through a movable reflector and positioning of the light beam is performed by a servo control circuit for feeding a signal from the light detector back to the movable reflector, comprises: an oscillator for oscillating in response to an initializing signal and moving the movable reflector to move the beam onto the light detector; and a control switch for separating the oscillator and the movable reflector from each other in response to the signal from the light detector, the oscillator and the control switch being arranged in the servo control circuit.

6 Claims, 5 Drawing Sheets

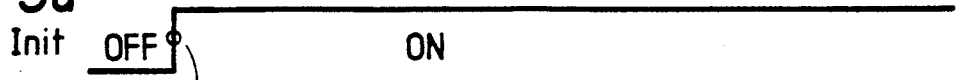
FIG. 3a Init
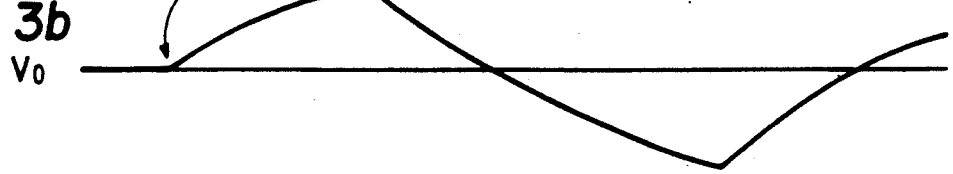
FIG. 3b $V_0$
FIG. 3c $V_{a1}$
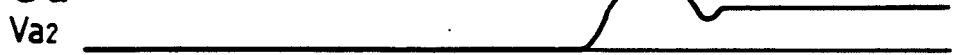
FIG. 3d $V_{a2}$
FIG. 3e $(V_{a1}+V_{a2})$ $V_r$
FIG. 3f $V_s$
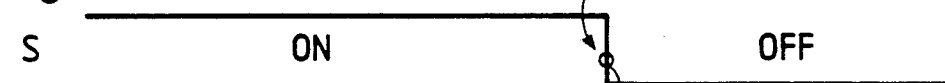
FIG. 3g S
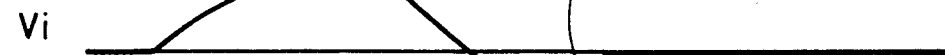
FIG. 3h $V_i$
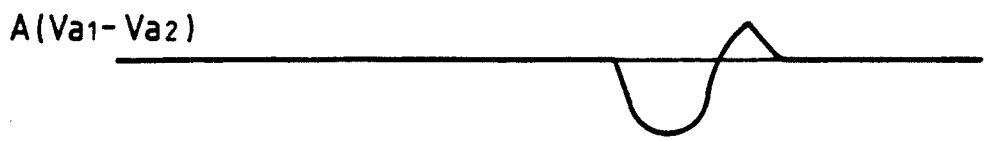
FIG. 3i $A(V_{a1}-V_{a2})$
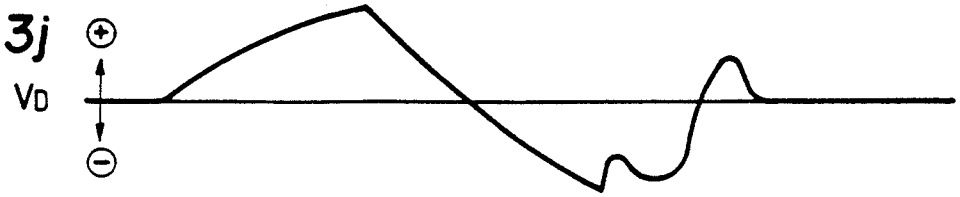
FIG. 3j $V_D$ ⊕ ⊖

BEAM POSITION CONTROL APPARATUS

BACKGROUND OF THE INVENTION

Field of the Invention

The present invention relates to an optical scanning apparatus, and particularly to a beam position control apparatus in an apparatus for scanning a plurality of beams in parallel by use of a plurality of light sources.

Description of the Related Art

In an optical scanning apparatus such as a laser printer, light-beam scanning is realized by moving a rotary polyhedron mirror or a vibratory mirror at a high speed. In this case, as the speed and resolution of the apparatus become higher, it is indeed necessary to make its operation speed extremely higher, while there is a limitation therein.

In order to cope with this problem, an optical scanning apparatus in which a plurality of light beams are scanned in parallel at the same time by use of a plurality of light sources where the intervals between the respective beams are kept constant has been proposed, such as a laser printer optics using two semiconductor lasers, in FIG. 12 in Japanese Unexamined Patent Publication No. Sho-63-217763 as well as in FIG. 7.63 in "Applied Optical Electronics Handbook" (published by Shokodo Co., Ltd., Apr. 10, 1989). FIG. 8 shows an example of such an optical scanning apparatus. In this example, it is necessary to provide a controller 1 for attaining the above-mentioned object, and, generally, the controller is arranged so as to perform servo control. This servo control technique is disclosed in the above-mentioned Applied Optical Electronics Handbook. That is, in Chapter 6, "Optical Information Equipment Elementary Techniques," in the Handbook, FIG. 6.15 shows a block diagram of an optical disk system servo system, FIG. 6.138 shows a block diagram of a focusing servo system, FIG. 6.139 shows an open loop characteristic of a focusing servo system, etc. However, these systems belong to a control technique for an optical disk system, and the following problems to be solved occur in the case of controlling such "laser printer optics using two semiconductor lasers" as shown in FIG. 8.

In FIG. 8, when the controller 1 receives a signal 3 from a light detector 2 to thereby control movable reflectors 4a and 4b, both beams 5a and 5b must be partially incident to the light detector 2. In order to make the beams 5a and 5b be within the light detector 2 when the electric power source of a laser printer or the like is turned on, however, it is necessary to adjust initial angles of the movable reflectors 4a and 4b so as to set initial positions of the beams accurately. There is however a problem, as this adjustment is complicated and the setting becomes easily displaced by the disturbance such as a temperature change, vibrations, etc.

In addition, when the beams are impinging onto a drum surface 6, that is, when printing is being performed, the beams also impinge onto the light detector 2 so as to make servo control possible, but when there is no print signal, that is, at the off-time of light generating sources 7a and 7b in the duration in which they are repeatedly turned on and off, there is a problem that the beams do not impinge onto the light detector 2. In order to solve this problem, a sample holding circuit which obtains a sample signal by turning on the light generating sources in the non-printing period and holds the sample signal in the other period is provided (for example as disclosed in Japanese Unexamined Patent Publication No. Sho-61-245174). In this technique, however, there is a problem of control delay.

In addition, a beam interval $P_D$ on the drum surface 6 depends on a beam interval P on the detector 2, and generally the detector 2 is constituted by four optical sensors 10 to 13 as shown in FIG. 9. The beam 5a is controlled to be in the center of the optical sensors 10 and 11, and the bean 5b is controlled in the center of the optical sensors 12 and 13, so that the beam interval P on the light detector 2 is kept constant. In this case, although the beam interval P is set into a predetermined value, there is a problem that setting into the predetermined value is difficult due to either the scattering of positions and characteristics on producing the optical sensors 10 to 13 or the beam shape errors (for example, not a true circle) of the beams 5a and 5b.

Alternatively, there is a case in which galvano-mirrors having as high of a reliance as those used for tracking actuators in an optical disk apparatus are used as the movable reflectors 4a and 4b. In this case, the movable reflectors 4a and 4b have a moving coil type response and thereby become secondary delay factors. In order to stabilize this time control system, as shown in FIG. 10, it is common to perform phase adjustments to take a large enough value for a gain G, for example, a gain surplus of 17, at a frequency f which makes a phase ph be $-180°$ as described above (the open loop characteristic of a focusing servo system). In this case, the initial angles of the movable reflectors 4a and 4b of FIG. 8 are set so that the beams 5a and 5b come in the center of the optical sensors 10 and 11 and in the center of the optical sensors 12 and 13, respectively, as shown in FIG. 9.

Assume that the beam 5a or 5b comes away by $\Omega$ from the center of the optical sensors 10 and 11 or from the center of the optical sensors 12 and 13 in FIG. 9. Then, if the servo control of FIG. 10 is performed, the center of the beam 5a or 5b comes away by $(1/1+G_o) \times \Omega$ from the center of the optical sensors 10 and 11 or from the center of the optical sensors 12 and 13, wherein $G_o$ represents a DC gain in FIG. 10. In order to establish the beam interval $P_D$ of the optical scanning apparatus in FIG. 8 to be a value of the order of several μm, it is necessary that the DC gain $G_o$ takes a large enough value. However, since the DC gain $G_o$ depends on the characteristics of the movable reflectors 4a and 4b, the gain surplus 17 is lowered if the gain G is increased, causing the problem that the control becomes unstable.

SUMMARY OF THE INVENTION

It is therefore an object of the present invention to solve the foregoing problems in the prior art.

It is another object of the present invention to provide a beam position control apparatus by which servo control can be performed steadily.

In order to attain the above objects, according to the present invention, the following configurations are employed.

To easily adjust the initial position of light beams, an oscillator for oscillating according to an initializing signal and outputting an oscillation signal, and a control switch operating according to a signal from a light detector, which receives a plurality of light beams from a plurality of light generating sources reflected by a movable reflector, are located in a beam position control circuit which feeds the signal from the light detector back to the movable reflector.

Provided in the beam position control circuit are a sample-hold circuit for obtaining a sample signal by turning on the light generating sources in a period when a signal from a light detector is independent of a print signal, that is, in blanking period except during a printing period, feeding back the sample signal, and holding said sampled signal except during the above-mentioned sample period, and a phase advance circuit for compensating phase delay of the sample-hold circuit due to dead time of sample holding.

A voltage adjusting means for adjusting position signals from a plurality of light detectors is provided in the beam position control circuit which feeds signals from the above-mentioned detectors back to the movable reflector.

Further provided is a phase delay circuit for functioning in a low frequency region that does not influence a frequency which gives a gain surplus according to the control characteristics of the movable reflector.

The oscillator is made to oscillate according to an initializing signal to move the movable reflector to thereby move the beam, so that it is easy to make the beam impinge onto the light detector to make it possible that the light detector can detect the beam to thereby realize servo control. Further, by providing the phase advance circuit for compensating phase delay in the sample-hold circuit, the phase delay can be compensated. Since a positional error of each detector or a characteristic error on its production is adjusted by the voltage adjusting means, it is possible to adjust the position of the beam accurately. Since the phase delay circuit in a low frequency region is provided to improve a gain in the low frequency region, it is possible to suppress the positional change of the beam.

BRIEF DESCRIPTION OF THE DRAWINGS

Other features and advantages of the present invention will be apparent from the following description taken in connection with the accompanying drawings, wherein:

FIGS. 3a-3j show a timing chart at the initialization of the beam control circuit of FIG. 2;

DETAILED DESCRIPTION OF THE PREFERRED EMBODIMENTS

Figure 1:
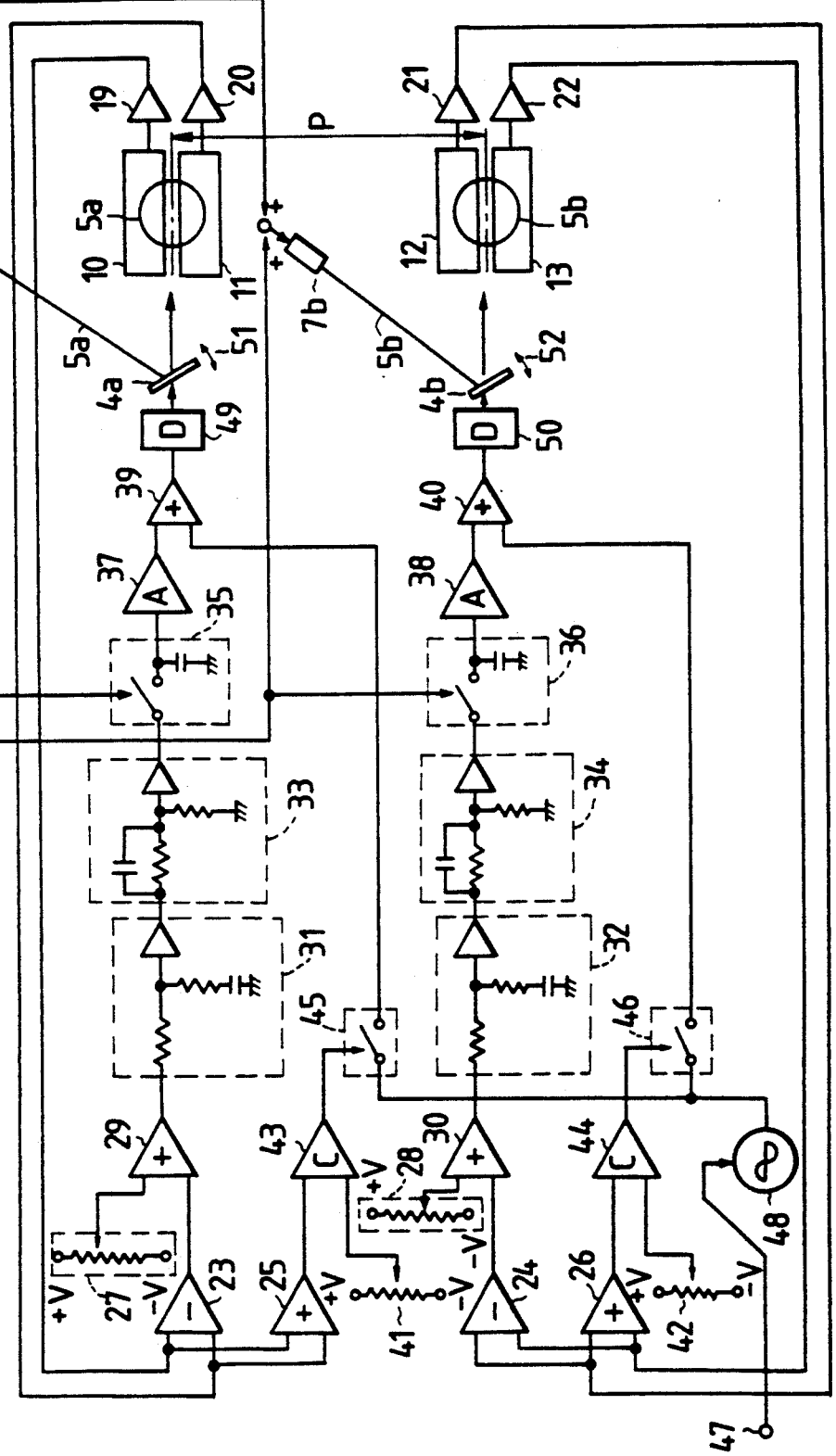
FIG. 1 is a block diagram of a beam position control apparatus according to the present invention.

An embodiment of the present invention will be described with reference to FIGS. 1 to 7. FIG. 1 is a block diagram of a beam position control apparatus. In FIG. 1, beams 5a and 5b emitted from light generating sources 7a and 7b are reflected on movable reflectors 4a and 4b, respectively, so that the beam 5a goes toward optical sensors 10 and 11, and the beam 5b goes toward optical sensors 12 and 13. The respective outputs of the optical sensors 10 to 13 are put into voltage converters 19 to 22, respectively, so that the outputs are converted into voltage signals. The respective outputs of the voltage converters 19 to 22 are supplied to subtracters 23 and 24 and adders 25 and 26. The respective outputs of the subtracters 23 and 24 are supplied to adders 29 and 30 in which the outputs are added to adjusted voltages from voltage adjustment means 27 and 28. The respective outputs of the adders 29 and 30 are supplied to one of adders 39 and 40 through phase delay circuits 31 and 32, phase advance circuits 33 and 34, sample holding circuits 35 and 36 and amplifiers 37 and 38. On the other hand, the respective outputs of the adders 25 and 26 are compared with set voltages from set voltage generators 41 and 42 by comparators 43 and 44, thereby controlling the on-off of control switches 45 and 46. The control switches 45 and 46 have an input from an oscillator 48, which is driven by initializing signal 47, and an output to one of the adders 39 and 40. The respective outputs of the adders 39 and 40 are supplied to drivers 49 and 50, by which the movable reflectors 4a and 4b are moved in the directions of arrows 51 and 52. The sample-hold circuits 35 and 36 are controlled for sampling and holding by a sample signal generator 53, and the output signal of the sample signal generator 53, which is added to a signal from a print signal generator 54, drives the light generating sources 7a and 7b.

Figure 2:
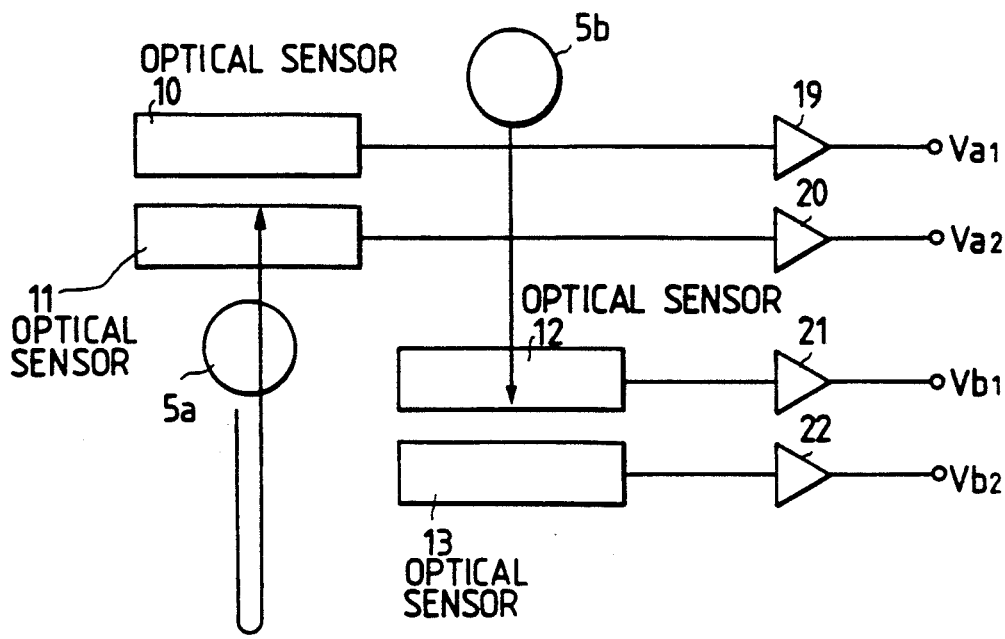
FIG. 2 shows the initialization of a beam control circuit according to the present invention.

FIGS. 2 and 3 show the initialization of a beam control circuit. In FIG. 2, the initial positions of the beams 5a and 5b depend on the initial establishment of the movable reflectors 4a and 4b in FIG. 1, so that the beam 5a is positioned below the optical sensors 10 and 11, and the beam 5b is positioned above the optical sensors 12 and 13. Then, the optical sensors 10 and 11 are disposed on a moving locus of the beam 5a and the optical sensors 12 and 13 are disposed on a moving locus of the beam 5b. These initial beam positions are those in which adjustment of the movable reflectors 4a and 4b are made easy and which are not affected by a disturbance such as a temperature change, vibrations, etc. The operation will be described with reference to the timing chart of FIG. 3. Since the beams 5a and 5b have the same operation, the description will discuss beam 5a.

In FIG. 1, if an initializing signal 47 is applied (if the signal Init shown in FIG. 3(a) is turned on), an oscillator 48 outputs $V_o$ as shown in FIG. 3(b). At this time, the control switch 45 is in an ON state as shown by S in FIG. 3(g). Then, in FIG. 2, the beam 5a is out of the optical sensors 10 and 11, so that both outputs $V_{a1}$ and $V_{a2}$ from the voltage converters 19 and 20 are zero, and the output of the adder 25 in FIG. 1 (the signal ($V_{a1}+V_{a2}$) shown in FIG. 3(e)) is zero. Therefore, the output of the comparator 43 (the signal $V_s$ shown in FIG. 3(f)) is OFF, so that the control switch 45 (S shown in FIG. 3(g)) keeps its ON state. The voltage $V_o$ having passed the control switch 45 is supplied to the adder 39 in FIG. 1 (the signal $V_i$ shown in FIG. 3(f)). On the other hand, although the adder 39 receives a differential signal of $V_{a1}$ and $V_{a2}$ in FIG. 2 (the signal $A(V_{a1}-V_{a2})$ shown in FIG. 3(i)) as its other input, either input is zero as mentioned above so that the output of the driver 49 (the signal $V_D$ shown in FIG. 3(j)) becomes an output of the oscillator 48 (the signal $V_o$ shown in FIG. 3(b)). When the signal $V_D$ shown in FIG. 3(j) comes into the positive side, the movable reflector 4a moves so as to move down the beam 5a. According to FIG. 2, the initial moving direction of the beam 5a is opposite to the optical sensors 10 and 11 so that the beam 5a cannot be incident onto the optical sensors 10 and 11 when the beam is left as it is. However, if the signal $V_o$ shown in FIG. 3 continues oscillating so that its output reverses, the signal $V_D$ also goes to the negative side so that the beam 5a can be incident onto the optical sensors 10 and 11 of FIG. 2. The beam 5a is first incident into the optical sensor 11, so that the signal $V_{a2}$ is put out. If the signal $(V_{a1}+V_{a2})$ shown in FIG. 3 is over the reference voltage $V_r$ (the signal $V_r$ shown in FIG. 3) from the set voltage generator 41, the output of the comparator 43 is turned on (the signal $V_s$ shown in FIG. 3), thereby turning the control switch 45 off (S in FIG. 3(g)) and cutting off the input $V_o$ from the oscillator 48 (the signal $V_i$ shown in FIG. 3(h) becomes zero). On the other hand, the signal $V_{a2}$ passes through the amplifier 37 and so on, and reaches the driver 49, so that servo control can be performed from this time. In addition, because of the positional relationship between the optical sensors 10 and 11 and the optical sensors 12 and 13, there is no case where error signals are caused by the other beam.

Figure 5:
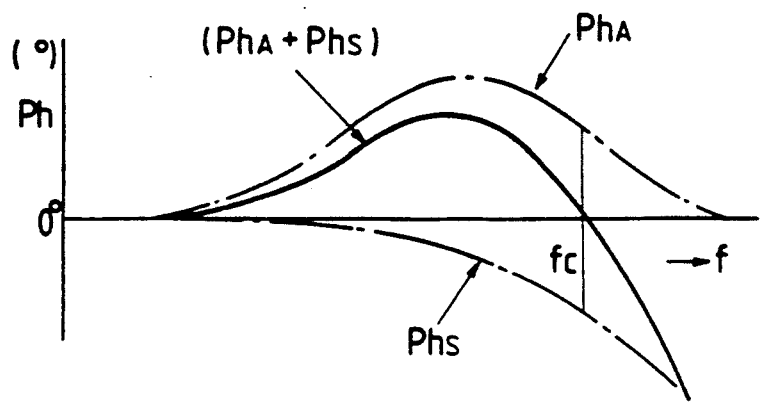
FIG. 5 is a Bode diagram showing the characteristics of a phase advance circuit according to the present invention.
Figure 6:
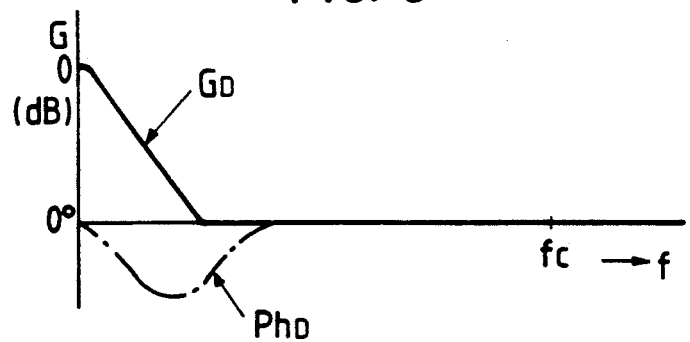
FIG. 6 is a Bode diagram showing the characteristics of sample-hold circuit according to the present invention.
Figure 7:
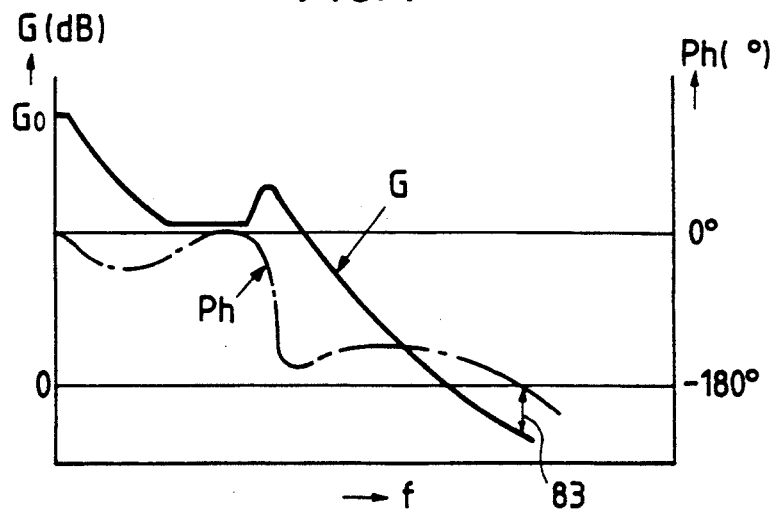
FIG. 7 is a Bode diagram showing the characteristics of a phase delay circuit according to the present invention.

Next, the operation of the sample signal generator 53 and the print signal generator 54 will be described with reference to the timing chart in FIG. 4. In addition, FIGS. 5 to 7 are Bode diagrams illustrating characteristics of the phase advance circuits 33 and 34, the sample-hold circuits 35 and 36, and the phase delay circuits 31 and 32 from the view of a servo system.

Figure 4:
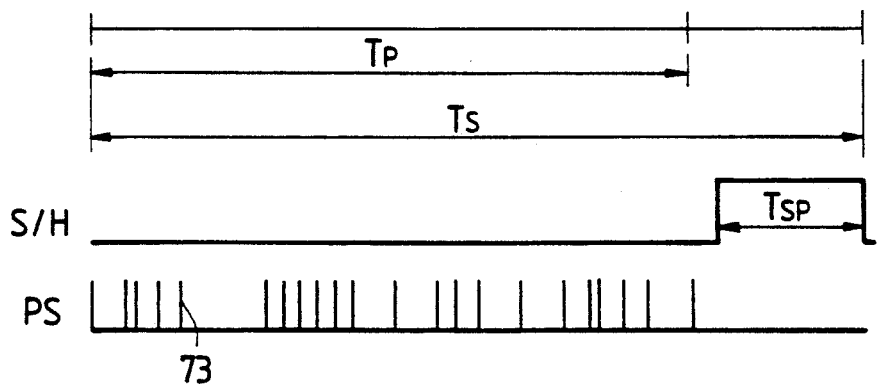
FIG. 4 is a timing chart showing the operation of a sample signal generator and a print signal generator according to the present invention.
Figure 8:
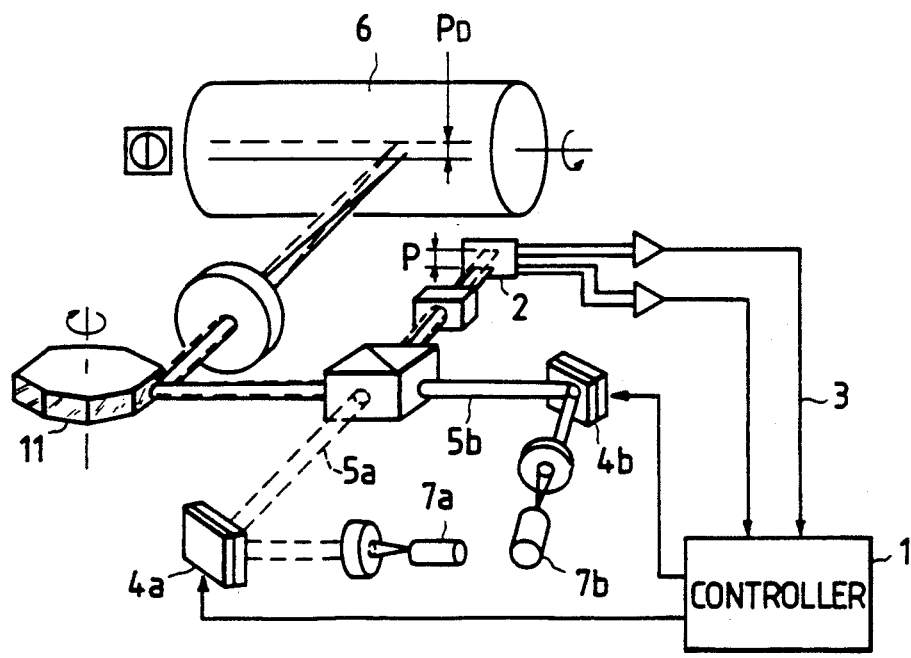
FIG. 8 shows a conventional optical scanning apparatus.
Figure 9:
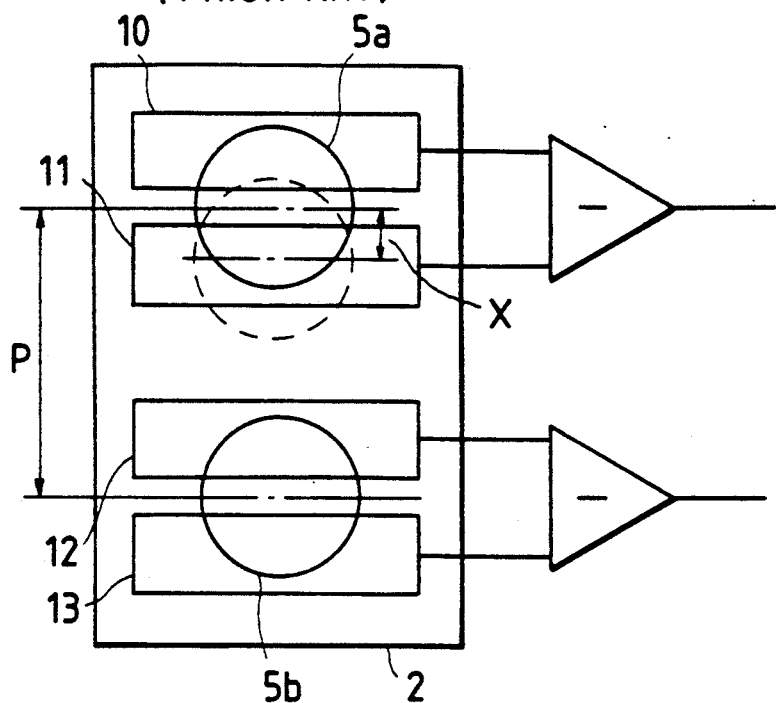
FIG. 9 shows a light detector used in the apparatus of FIG. 8.
Figure 10:
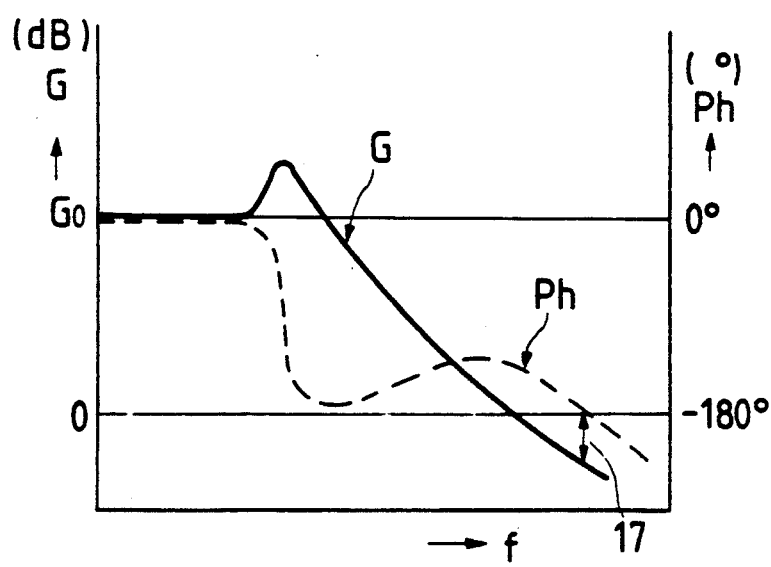
FIG. 10 is a Bode diagram showing the open loop characteristics of a focusing servo system.

In FIG. 4, $T_s$ is a scanning period depending on a rotation period of a light deflector 11 in FIG. 8. $T_p$ is a print period in which the beams 5a and 5b scan the drum surface 6 to perform printing. The print signal generator 54 generates a print signal 73 in the period $T_p$ in FIG. 4, and the print signal 73 is illustrated as $P_s$ in FIG. 4.

On the other hand, the sample signal generator 53 generates a signal in a sample period $T_{sp}$ which is a part of the difference between $T_p$ and $T_s$ in FIG. 4 (shown by S/H in FIG. 4).

Since these signals produced from the print signal generator 54 and the sample signal generator 53 are applied to the light generating sources 7a and 7b, the light generating sources 7a and 7b are turned on by the signal from the sample signal generator 53 even when there is no print signal. By detecting the beams 5a and 5b at this time by the optical sensors 10 to 13, it is possible to make feedback. At this time, the sample-hold circuits 35 and 36 are controlled by the sample signal generator 53 so as to pass signals in the period $T_p$ shown FIG. 4 and hold data immediately before in the rest period.

In the case of sampling and holding data by the above-mentioned configuration, as shown in FIG. 5, its phase $Ph_s$ is gradually delayed in relation to the sample-hold time. In order to further compensate for this, the phase advance circuits 33 and 34 select the curve $Ph_A$ shown in FIG. 5 so that the phase is made to be $(Ph_A+Ph_s)$ in the sample holding and phase advance to thereby prevent the sample holding from badly influencing it. (In FIG. 5, Ph and f represent phase and frequency respectively).

Next, the phase delay circuits 31 and 32 having a characteristic shown in FIG. 6 to increase a DC gain will be described. The phase delay circuits 31 and 32 constitute low pass filters showing a characteristic to delay their phases in a low frequency region and increase their gains in the low frequency region in comparison with a high frequency region. In FIG. 6, by giving phase delay $Ph_D$, its gain $G_D$ is improved in a low frequency region. Then, the phase delay $Ph_D$ is established away from a phase adjustment region $f_c$ shown in FIG. 5, so as to give no bad influence onto the stability of the servo system. In FIG. 6, although a gain G is 0 (dB) if a frequency f is zero, the gain of a total servo characteristic can be adjusted by the amplifiers 37 and 38 in FIG. 1. FIG. 7 is a Bode diagram illustrating a total servo characteristic including the movable reflectors 4a and 4b, the optical sensors 10 to 13, the amplifier 37 and so on as well as the sample-hold circuits 35 and 36, the phase delay circuits 31 and 32 and the phase advance circuits 33 and 34 which have been described in FIG. 1.

In FIG. 7, the gain G and the phase Ph are established so that the DC gain $G_o$ is sufficiently high and the gain surplus 83 is also sufficient, showing the stability of the servo control.

Finally, the voltage adjustment means 27 and 28 in FIG. 1 will be described. In FIG. 2, among the respective outputs $V_{a1}$, $V_{a2}$, $V_{b1}$ and $V_{b2}$ from the voltage converters 19 to 22, if the optical sensors 10 to 13 and the beams 5a and 5b are accurate enough, the relationships $V_{a1}=V_{a2}\neq 0$, $V_{b1}=V_{b2}\neq 0$ are established when the beams 5a and 5b come to the center of the optical sensors 10 to 13. However, if there is a scattering of the beam in production or displacement of initial beam position, $\Delta V_a=V_{a1}-V_{a2}$ or $\Delta V_b=V_{b1}-V_{b2}$ is produced as the offset quantity, so that it is impossible to set pitches of the beams 5a and 5b to predetermined values. Therefore, the voltage adjustment means 29 and 30 are to compensate the above-mentioned $\Delta V_a$ and $\Delta V_b$. In FIG. 1, variable resistors are used for the voltage adjustment means 27 and 28. By adjusting the resistance values of the variable resistors, the beam interval $P_D$ on the drum surface 6 in FIG. 8 in the state of performing servo control can be set accurately to appear as a print result in the case of a laser printer, for example.

Although the present invention has been described along two beams, the present invention can be applied to a plurality of beams.

The present invention has the following effects which perform a stable servo control as a whole.

1. Since an oscillator and a control switch are provided in a beam position control circuit, this makes the initial establishment of movable reflectors easy without being influenced from disturbances such as a temperature change, vibrations, etc.

2. Since provided, also, is a phase advance circuit for compensating the phase delay of a sample-hold circuit, it is possible to perform a stable servo control even when there is no print signal.

3. Since further provided is a voltage adjustment means for adjusting a plurality of position signals, it is possible to set the intervals of a plurality of beams accurately.

4. Since further provided is a phase delay circuit in a low frequency region, it is possible to take a high DC gain keeping a stable servo control, so as to make the initial adjustment of movable reflectors easy.

What is claimed is:

1. A beam position control apparatus, comprising:
   light generating means for generating a light beam;
   a movable reflector;
   light detector means for receiving light reflected by said movable reflector and generating an electrical light detector signal responsive thereto;
   means for generating an initializing signal;
   servo control means for receiving said electrical light detector signal from said light detector means, and processing said signal to move said movable reflector to position said light beam;
   said servo control means comprising:
   oscillator means for oscillating in response to said initializing signal and producing an output oscillator signal; and
   control switch means for receiving said electrical light detector signal and receiving said output oscillator signal, then generating a signal responsive thereto which controls a driver to move said moveable reflectors.

2. A beam position control apparatus according to claim 1, in which said light generating means includes a plurality of light generating sources and said light beam includes a plurality of light beams.

3. A beam control apparatus according to claim 2, in which said light detector means are disposed in a place away from moving loci of different said light beams.

4. A beam position control apparatus, comprising:
   a plurality of light generating sources generating light beams;
   a plurality of movable reflectors;
   light detector means for receiving said light beams reflected by said movable reflectors and generating an electrical light detector signal responsive to said light beams, said light detector working in accordance with a beam scanning period;
   light deflecting means for making said light beams scan a drum surface;
   servo control circuit means for receiving said electrical light detector signal, and processing said signal to move said movable reflectors to position said light beams;
   said servo control circuit comprising:
   means for identifying a printing period for said light beams to scan;
   means for generating a sample signal in a sample period;
   sample-hold circuit means for 1) sampling a feedback signal, derived from said light detector, according to the sample signal in the sample period within a difference between the beam scanning period and the printing period, and 2) for holding said sampled signal in a period out of said sample period; and
   a phase advance circuit for compensating phase delay of said sample-hold circuit due to dead time of sample holding.

5. A beam position control apparatus according to claim 4, in which said servo control circuit includes a phase delay circuit for delaying a phase in a low frequency region which gives no influence onto a frequency region showing a gain surplus keeping the stability of a servo system on servo characteristics, so as to improve a DC gain.

6. A beam position control apparatus, comprising:
   a plurality of light generating sources generating a plurality of light beams;
   a plurality of movable reflectors;
   a plurality of light detectors receiving said light beams positioned by said movable reflectors and generating electrical position signals responsive thereto;
   a servo control circuit for receiving said electrical position signals from said light detector, and processing said signal to move said movable reflectors; and
   said servo control circuit comprising:
   voltage adjusting means for adjusting the position signals from said light detectors.

* * * * *